United States Patent [19]

Matsuda et al.

[11] Patent Number: 5,044,545
[45] Date of Patent: Sep. 3, 1991

[54] OIL COOLER AND PROCESS FOR MANUFACTURING THE SAME

[75] Inventors: Masayuki Matsuda; Toyoharu Nishimura, both of Himeji; Yasuji Takagi, Ebina; Mamoru Tanaka, Isehara; Naoki Norimatsu, Zama, all of Japan

[73] Assignees: Nichirin Rubber Industrial Co., Ltd., Kobe; NHK Spring Co., Ltd.; Nissan Motor Co., Ltd., both of Yokohama, all of Japan

[21] Appl. No.: 544,093

[22] PCT Filed: Jan. 20, 1989

[86] PCT No.: PCT/JP89/00055
§ 371 Date: Sep. 15, 1989
§ 102(e) Date: Sep. 15, 1989

[87] PCT Pub. No.: WO89/06744
PCT Pub. Date: Jul. 27, 1989

Related U.S. Application Data

[62] Division of Ser. No. 415,342, filed as PCT JP-89/00055 on Jan. 10, 1989, published as WO89/06744 on Jul. 27, 1989, abandoned.

[30] Foreign Application Priority Data

Jan. 23, 1988 [JP] Japan .................................. 63-13383

[51] Int. Cl.⁵ ............................................... B23K 1/18
[52] U.S. Cl. ...................................... 228/183; 228/245
[58] Field of Search ........................ 165/151, 181, 182; 228/181, 183, 245

[56] References Cited

U.S. PATENT DOCUMENTS

| | | | |
|---|---|---|---|
| 858,258 | 6/1907 | Briscoe et al. | 228/183 X |
| 1,896,502 | 2/1933 | Whitaker | 165/166 X |
| 1,907,036 | 5/1933 | Belleau | 165/166 X |
| 2,081,303 | 5/1937 | Karmazin | 165/110 X |
| 2,138,091 | 11/1938 | Cortines | 165/167 X |
| 3,411,196 | 11/1968 | Zehnder | 228/183 X |
| 3,948,431 | 4/1976 | Niimi et al. | 228/181 X |

FOREIGN PATENT DOCUMENTS

| | | |
|---|---|---|
| 52-36914 | 8/1977 | Japan . |
| 54-112942 | 8/1979 | Japan . |
| 58-21776 | 2/1983 | Japan . |
| 58-46991 | 5/1983 | Japan . |
| 61-115886 | 9/1986 | Japan . |

Primary Examiner—Kenneth J. Ramsey
Attorney, Agent, or Firm—Armstrong, Nikaido, Marmelstein, Kubovcik & Murray

[57] ABSTRACT

The process of manufacturing an oil cooler which comprises the steps of:

(A) making cooling fins by forming a plurality of insertion holes of which inner brim is projected along the axial direction for inserting a plurality of tubes in each sheet to be transformed into cooling fins, and to drill a plurality of pores for inserting linear brazing materials at positions closed to the insertion holes, respectively, (B) inserting a plurality of tubes arranged in parallel into each of insertion holes of a number of the cooling fins respectively, and inserting linear brazing materials into the pores of each of the cooling fins, and (C) joining the brims of the cooling fins and the tubes by heating to melt said brazing materials.

2 Claims, 8 Drawing Sheets

OIL COOLER AND PROCESS FOR MANUFACTURING THE SAME

This application is a division of application Ser. No. 415,342 filed as PCT JP89/00055 on Jan. 10, 1989, published as WO89/06744 on Jul. 27, 1989, now abandoned.

1. TECHNICAL FIELD

The present invention relates to an oil cooler and a process for manufacturing the same, and more particularly, to the oil cooler suitable for an automobile hydraulic-circuit, especially for an hydraulic-circuit of a power-steering unit and the process for manufacturing the same.

2. BACKGROUND ART

Recently, in order to provide natural steering feeling to a power steering unit as much as possible, and in order to attain both stability performance at high speed traveling and light steerage characteristics at low speed traveling, pressure oil flowing through a hydraulic-circuit becomes to be controlled finely more and more. Accordingly, it is observed that the hydraulic-circuit tends to be complex, and oil temperature tends to be raised. For example conventional oil temperature has been about 100° C. at the highest, but in the latest date, the oil temperature becomes about 120° C. to 130° C. at the highest. Further, it is anticipated that the oil temperature will be raised more and more in future.

On the other hand, an internal space of an engine compartment for installing the power-steering unit becomes gradually narrower, since a turbo-supercharger or the like is mounted in the engine compartment for improving traveling performance and the height of the engine compartment is lowered for the purpose of improving aero-dynamics characteristics and obtaining a good appearance design.

By the way, as oil coolers conventionally used in an automobile power-steering unit, the units shown in FIG. 13 and 14 have been known.

The former oil cooler is a suitably bent steel pipe 51 with a length of about 1 to 2 m and an external diameter of about 10 mm, and is connected in a midway of a rubber hose 52 constructing a hydraulic-circuit of the power steering unit.

The latter oil cooler comprises the above-mentioned pipe 51 and a large number of heat-radiating fins 53 attached thereon.

However, the conventional oil coolers need large installing space because their lengths are about 1 to 2 m as mentioned above, namely they are generally long. Then, in order to accommodate the tendency toward high temperature expected in future, the pipe 51 should be lengthened further for the purpose of increasing a radiating area. In that case, it will be impossible to install the oil cooler in the engine compartment which is narrow even now.

Furthermore, in the conventional oil coolers, when a pressure oil flow rate is large, the line resistance increases and then the pressure at positions in the piping is raised. Therefore, the leakage can be caused at the connecting portion between the pipe and the rubber hose. In addition, when the whole of the pipe is vibrated by the vibration of the automobile, noise is often caused. Those problems are also caused by the excessive length of the pipe.

The oil cooler and process for manufacturing the same of the present invention are provided in consideration of the above-mentioned problems. An object of the present invention is to provide an oil cooler which has very compact construction, high cooling efficiency and no problem as to the noise and the leakage. Another object of the present invention is to provide a process of easily manufacturing the oil cooler with low cost.

DISCLOSURE OF THE INVENTION

In accordance with the present invention, there is provided an oil cooler comprising:
- a tube bundle having a plurality of tubes arranged in parallel;
- chambers connected to both ends of the tube bundle;
- hose fittings fixed to each chamber; and
- a plurality of cooling fines, each having a plurality of insertion holes of which inner brim is projected along the axial direction, fixed to the tube bundle by inserting the tubes into the insertion holes. In the present invention, number and length of the tubes can be freely increased and decreased depending on the required cooling capacity or an installing space.

The present invention also provides a process for manufacturing an oil cooler having chambers connected to both ends of a tube bundle, hose fittings fixed to each chamber and a large number of cooling fins fixed to the tube bundle, which comprises the steps of:
- (A) making cooling fins by forming a plurality of insertion holes of which inner brim is projected along the axial direction for inserting a plurality of tubes, in each sheet to be transformed into a cooling fine, and by drilling a plurality of pores for inserting linear brazing materials, at positions closed to the insertion hole,
- (B) inserting a plurality of tubes arranged in parallel into each of insertion holes of a number of the cooling fins, respectively, and inserting linear brazing materials into the pores of each of the cooling fins, and
- (C) joining the brims of the cooling fins to the tubes by melting the brazing materials.

The oil cooler of the present invention has a structure having a plurality of tubes arranged in parallel, therefore the oil cooler can be made short and small. Accordingly, the oil cooler of the present invention can be easily installed in a narrow engine compartment. In addition, a plurality of tubes and the cooling fins fixed to the tubes provide a sufficient radiation area and therefore, the oil cooler can attain high cooling efficiency. Further, since a sectional area of the flow passage is enlarged and the length is shortened by employing a plurality of tubes, the resistance in the passage is small and the pressure rise in the passage is low, and therefore, leakage through the connecting portion is prevented. In addition, since a plurality of tubes act as struts and the inner brims of the insertion holes of the cooling fins act to prevent the tubes from twisting, the strength of the whole structure, especially torsional rigidity, becomes higher. Accordingly, vibration of the oil cooler can be restrained and noise can be generally prevented from generating.

In the manufacturing process of the present invention, each cooling fin is a piece of sheet, in which a plurality of insertion holes are formed. Therefore, the fixing of the cooling fins to a plurality of tubes is very easy than the case of fixing for a number of fins to the tubes one by one. In addition, since the cooling fin is a piece of a plain sheet, a yield rate of material is high. Then, the oil cooler of the present invention can be made with low cost.

BEST MODE FOR PRACTICING THE INVENTION

Each embodiment of the oil cooler and the process for manufacturing of the present invention are described hereinafter according to the drawings.

Figure 1:
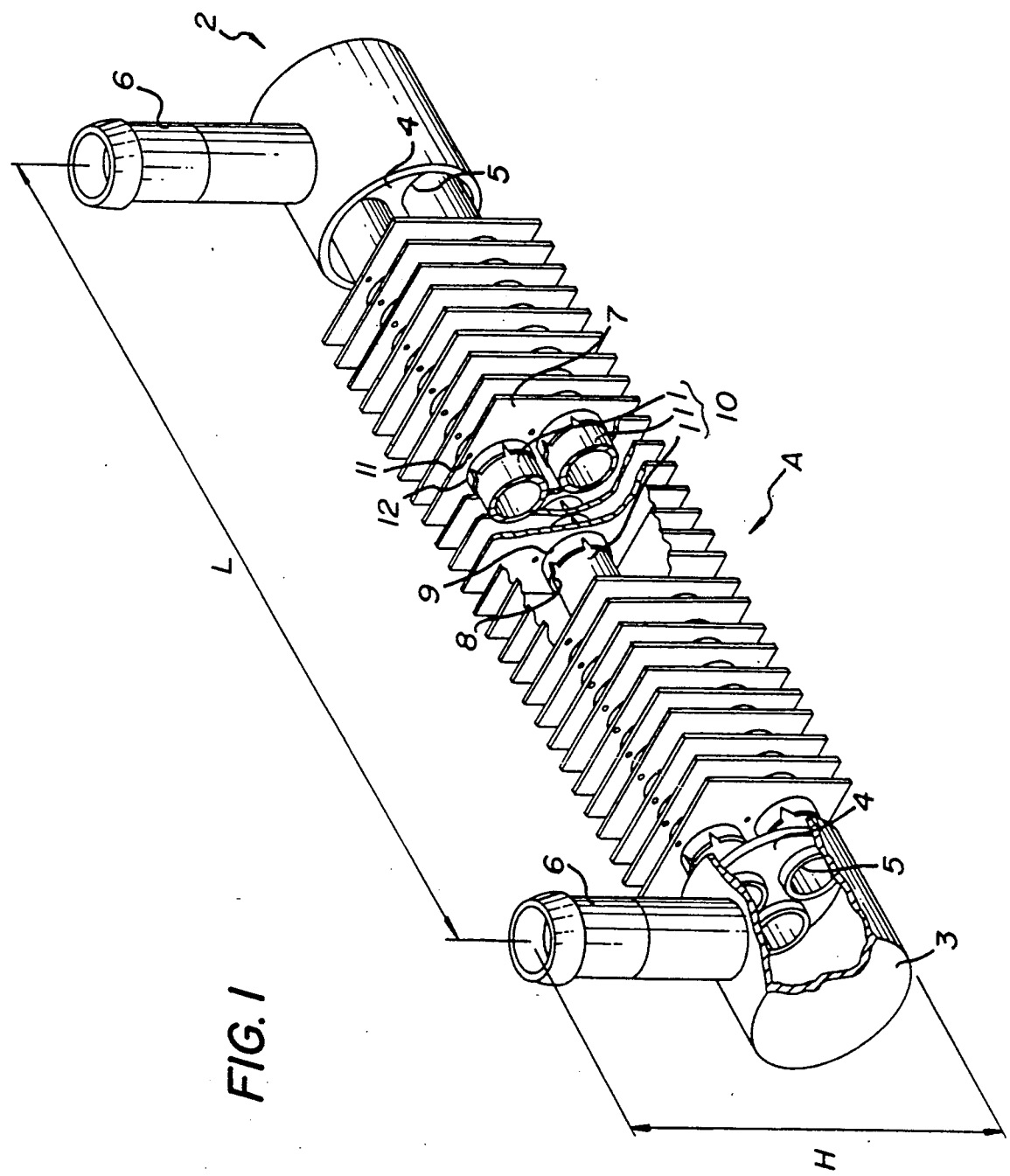
FIG. 1 is a partially cutaway perspective view of the oil cooler of the first embodiment of the present invention.
Figure 2:
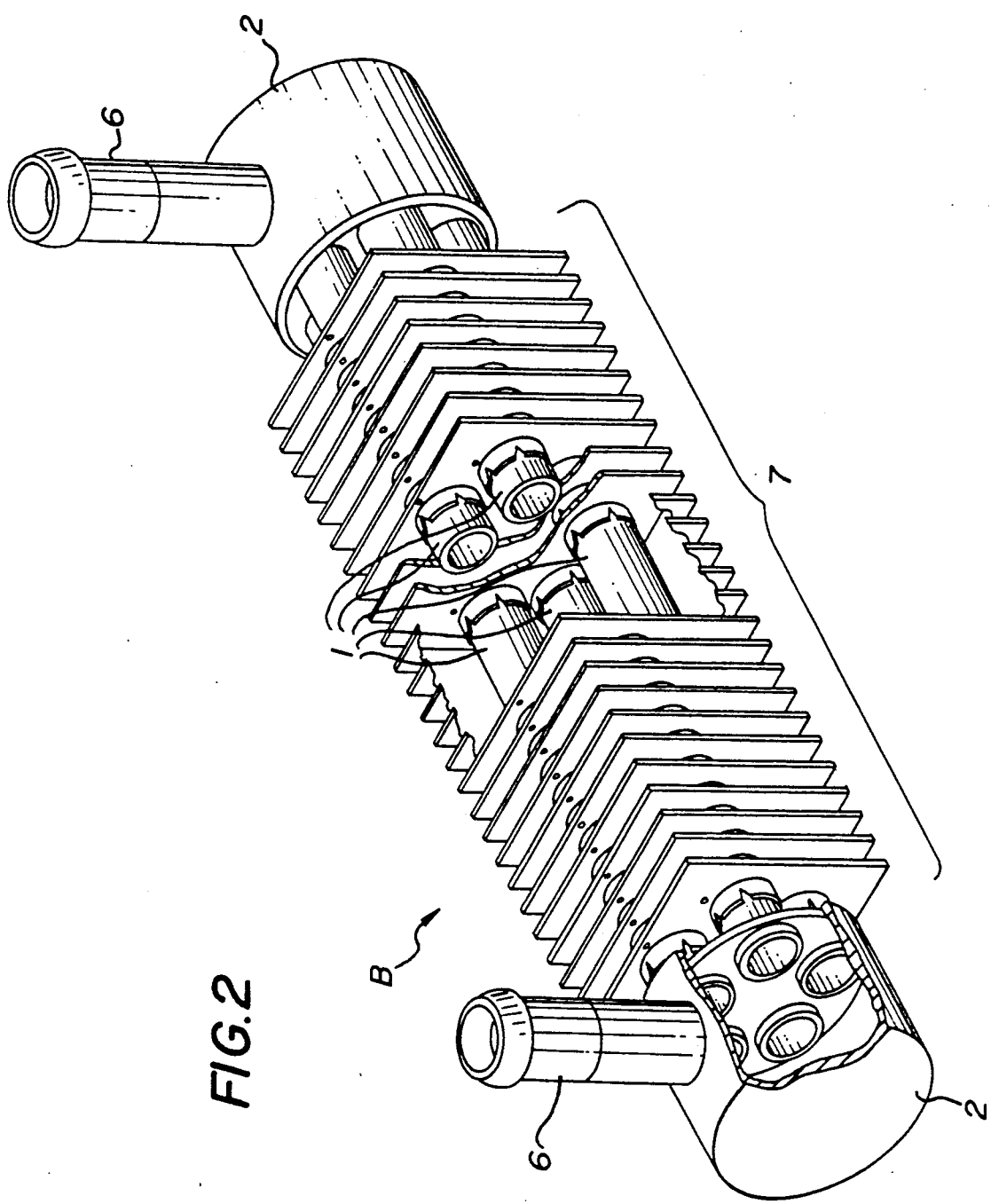
FIG. 2 is a partially cutaway perspective view of the oil cooler of the second embodiment of the present invention.

Referring firstly to FIGS. 1 to 11, the oil cooler of the present invention is described hereinafter. FIG. 1 shows an oil cooler A of the first embodiment, and FIG. 2 shows an oil cooler B of the second embodiment, respectively. In the first embodiment, a tube bundle 10 is made up of three tubes 1. In the second embodiment, a tube bundle is made up of five tubes 1. The second embodiment has higher cooling capacity since the second embodiment has more tubes. However, excepting the number of tubes, the construction is substantially common to the first and second embodiments. Therefore, the first embodiment is described hereinafter as a representative embodiment of the present invention.

The tube 1 is a copper pipe with an outside diameter of 7.85 mm, an inside diameter of 6 mm and an effective length of 120 mm. The diameter and length of the tube 1 can be increased and decreased freely depending upon the required cooling capacity and the installing space.

The reference numeral 2 designates chambers which are fixed to both ends of the tube bundle 10, respectively. The chamber 2 comprises a cylindrical body 3 having a bottom and a disk like lid 4. The end portions of the tubes 1 are inserted into holes 5 formed in the lid 4 and are fixed to the lid 4. Fitting 6 for connecting the body with a rubber hose is attached to the side wall of the body 3. The chamber 2 has a cylindrical inner space. Pressure oil from the fitting 6 flows to the tubes 1 through the space, and the pressure oil from the tubes 1 flows to the other fitting 6 through the space.

The reference number 7 designates cooling fins, each of which is made of a steel flat sheet. Three insertion holes 8 (five insertion holes 8 in the second embodiment) for inserting the tubes 1 are formed in the cooling fin 7. Each insertion hole 8 has an inner brim 9 projecting along the axial direction of the hole 8. The cooling fins 7 are fixed to the tubes 1 by inserting the insertion holes 8 therethrough.

The fin 7 is formed with pores 11 positioned nearly above each insertion holes 8, respectively. The pore 11 is a hole to insert a linear brazing material for brazing the brim 9 to the tube 1.

The cooling fin 7 in the first embodiment is a square sheet having a size of 24×24 mm, and the cooling fin 7 in the second embodiment is a square sheet having a size of 31×31 mm. In the both embodiments, 26 sheet of cooling fins 7 are fixed to the tubes 1 at intervals of 4 mm, respectively. The size and number of the cooling fins can be increased and decreased freely depending upon the required cooling capacity.

Next, advantages of the oil cooler of the first embodiment are described as follows.

Figure 13:
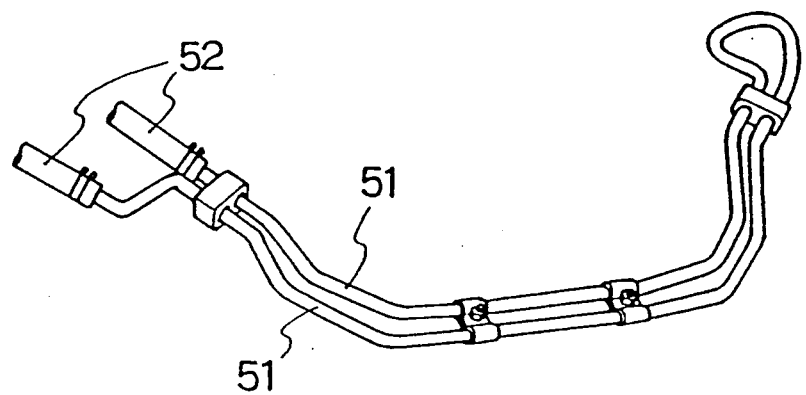
FIG. 13 and FIG. 14 are perspective views of conventional oil coolers respectively.
Figure 14:
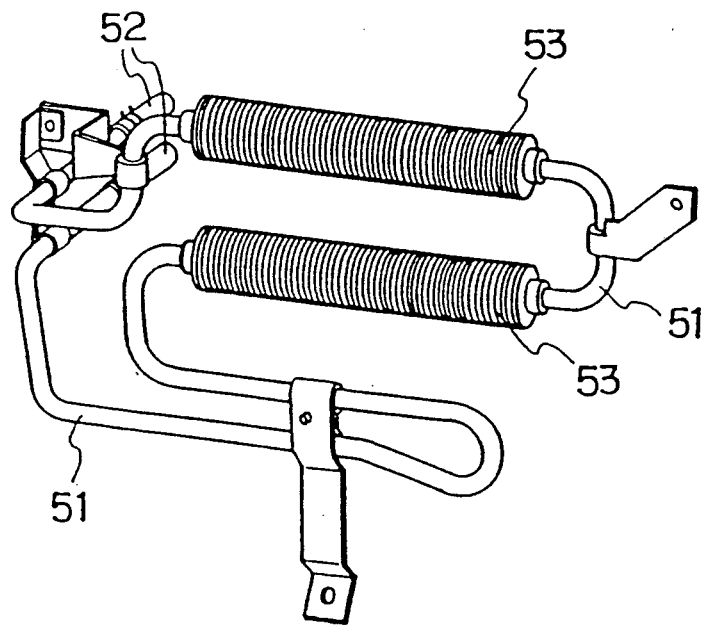

The first advantage of the embodiment is that the size is small. The center-to-center distance L between the fittings 6 is 140 mm, and the height H from the bottom of the chamber 2 to the top of the fitting 6 is merely 56 mm. Accordingly, as compared with the conventional device shown in FIG. 13 (the length of the pipe 51 is 1.8 m), piping interior volume (i.e. amount of the used oil) in the present embodiment is reduced to 26%, the piping cubic contents (i.e. the piping space) is reduced to 65%, and weight is reduced to 52% of the conventional device. Nevertheless, the present embodiment has a superior cooling capacity than the comparative example (shown in FIGS. 4 to 5) corresponding to the conventional device (shown in FIG. 13) as mentioned later.

Secondly, flow passage resistance or line resistance is low. The reason is that the flow passage sectional area is enlarged by employing a plurality of tubes 1 arranged in parallel.

Figure 3:
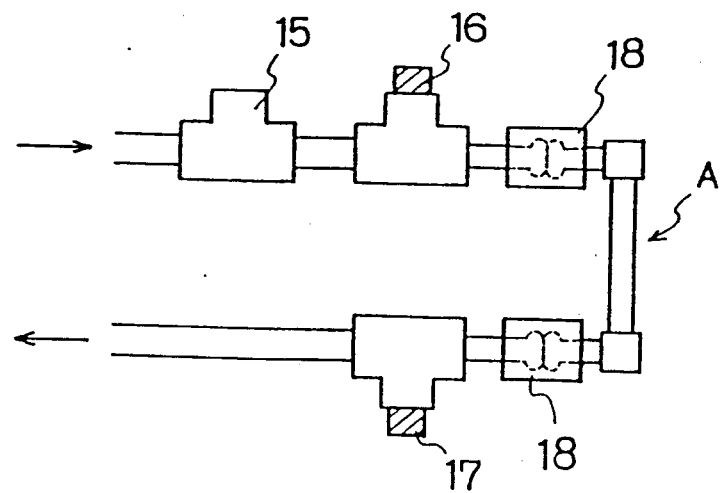
FIG. 3 is a view for illustrating a pressure loss measuring device.
Figure 4:
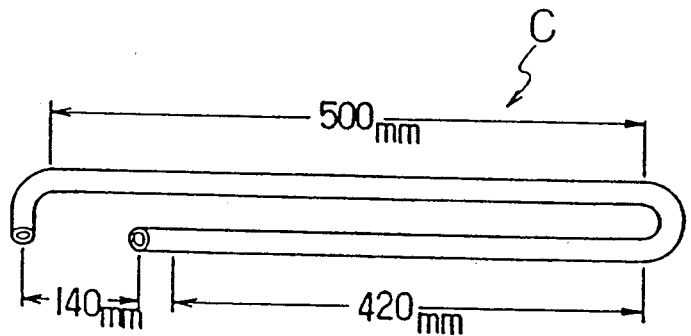
FIG. 4 and FIG. 5 are a front elevation and a side elevation of an oil cooler of a comparative example respectively.
Figure 5:
Figure 6:
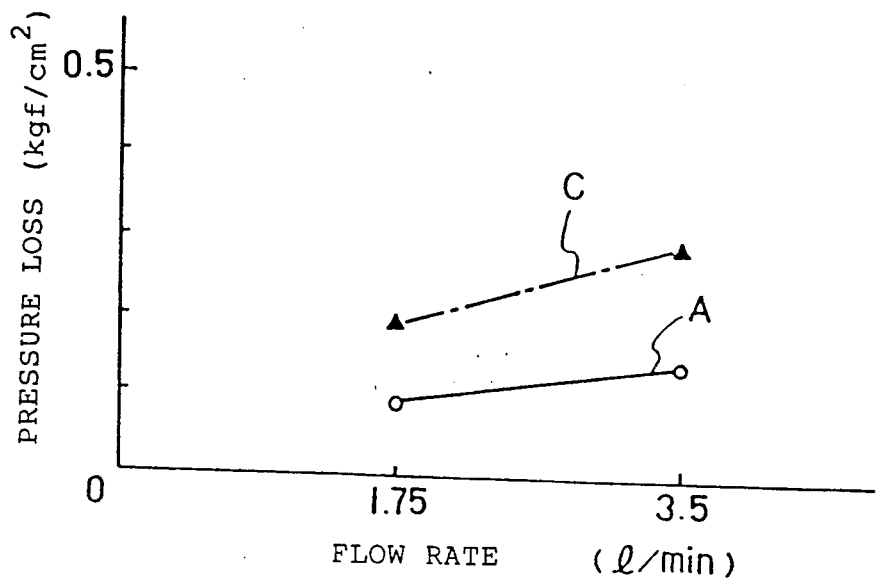
FIG. 6 is a graph showing a result of a pressure loss measuring test.

The pressure loss resulting from the resistance is examined with a testing machine shown in FIG. 3. In FIG. 3, the reference numeral 15 designates a flow meter, the numeral 16 designates a pressure sensor on the upstream side, the numeral 17 designates a pressure sensor on the downstream side, and the numeral 18 designates a joint. The oil cooler A of the first embodiment was connected between the pressure sensors 16 and 17 through the joints 18. Pressurized oil was supplied from the upstream side to the downstream side at a rate of 3.5 l/min. Next, the pressurized oil was supplied at a changed rate of 1.75 l/min. In both cases, the pressure in the upstream is 5 kgf/cm$^2$. Under the above conditions, pressure loss was obtained to calculate a difference between the pressure detected with the upstream side sensor 16 and the pressure detected with the downstream side sensor 17. The result of the examination is shown in the Table 1 and FIG. 6 with a Mark "A". While, an oil cooler C shown in FIGS. 4 and 5 was prepared as a comparative example corresponding to the conventional device shown in FIG. 13. The oil cooler C comprises a steel pipe with an outside diameter of 10 mm, an inside diameter of 8.6 mm and a full length of 1.2 m. The comparative example was also examined in a similar way, and the result is shown in the Table 1 and FIG. 6 with a Mark "C".

TABLE 1

| | Pressure of the upstream side (kgf/cm$^2$) | Pressure loss (kgf/cm$^2$) | |
|---|---|---|---|
| | | flow rate 3.5 (l/min) | flow rate 1.75 (l/min) |
| first embodiment | 5 | 0.14 | 0.09 |

TABLE 1-continued

| | Pressure of the upstream side (kgf/cm²) | Pressure loss (kgf/cm²) | |
|---|---|---|---|
| | | flow rate 3.5 (l/min) | flow rate 1.75 (l/min) |
| (A) comparative example (C) | " | 0.29 | 0.19 |

As mentioned above, the pressure loss of the first embodiment is reduced to about ½ in comparison with the comparative example, i.e. the conventional device. Therefore, since the internal pressure of the piping system is lowered, leakage at the connecting portion can be effectively prevented. In addition, rise of oil temperature caused by a passage resistance is low. Those characteristics are desirable for oil coolers.

Thirdly, the cooling capacity is high. This depends upon that whole surface area comprising a surface area of a plurality of tubes 1 and a surface area of a number of cooling fins 7 is very large.

Figure 7:
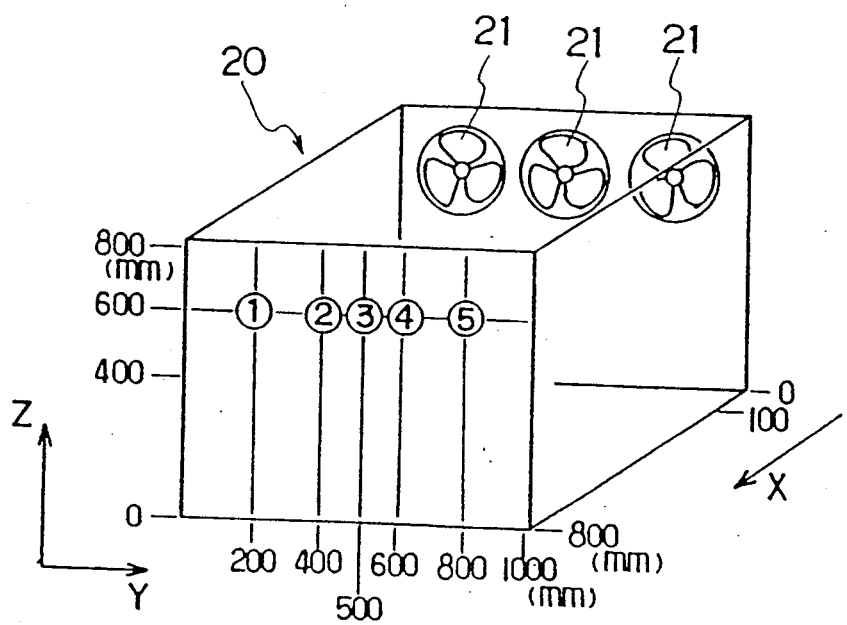
FIG. 7 is a view of a testing room used for a cooling capacity test.
Figure 8:
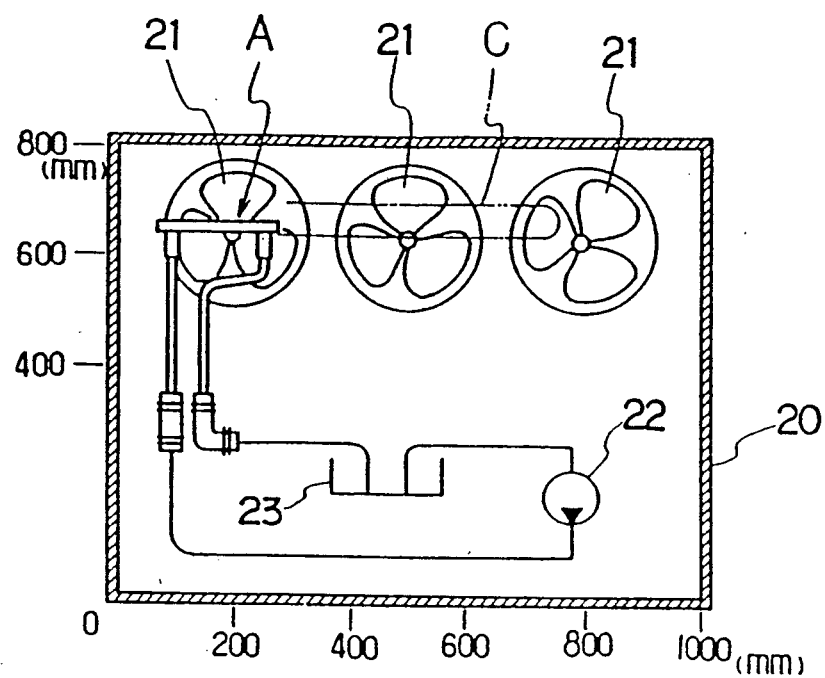
FIG. 8 and FIG. 9 are a front elevation and a side elevation showing a cooling capacity testing device.
Figure 9:
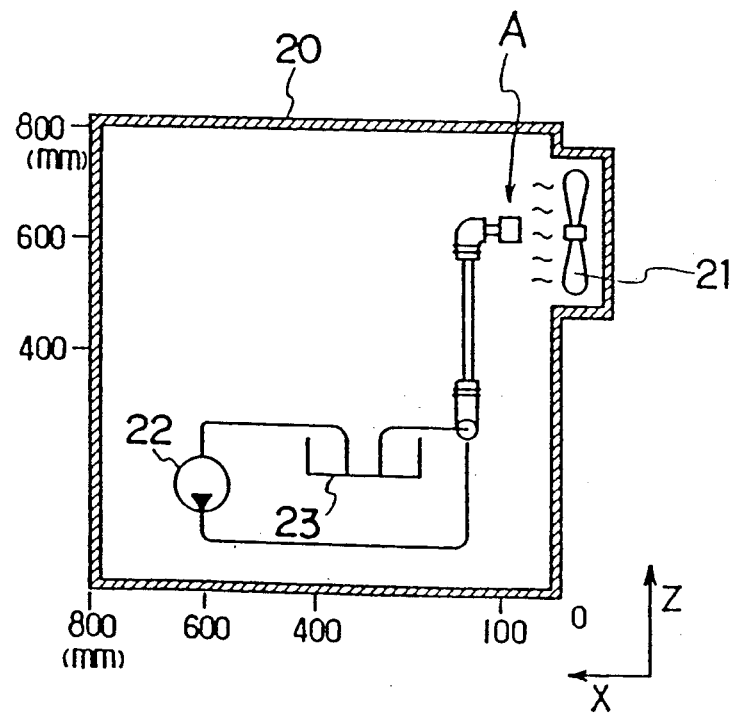

The cooling capacity was examined by means of the testing machine shown in FIGS. 7 to 9.

Figure 10:
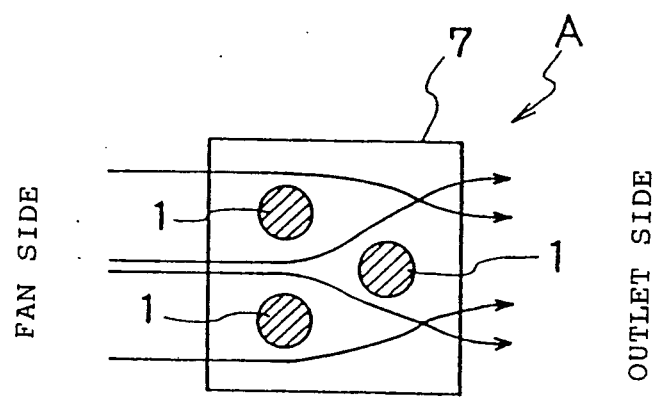
FIG. 10 is a view showing a mounting state of the oil cooler of the first embodiment.
Figure 11:
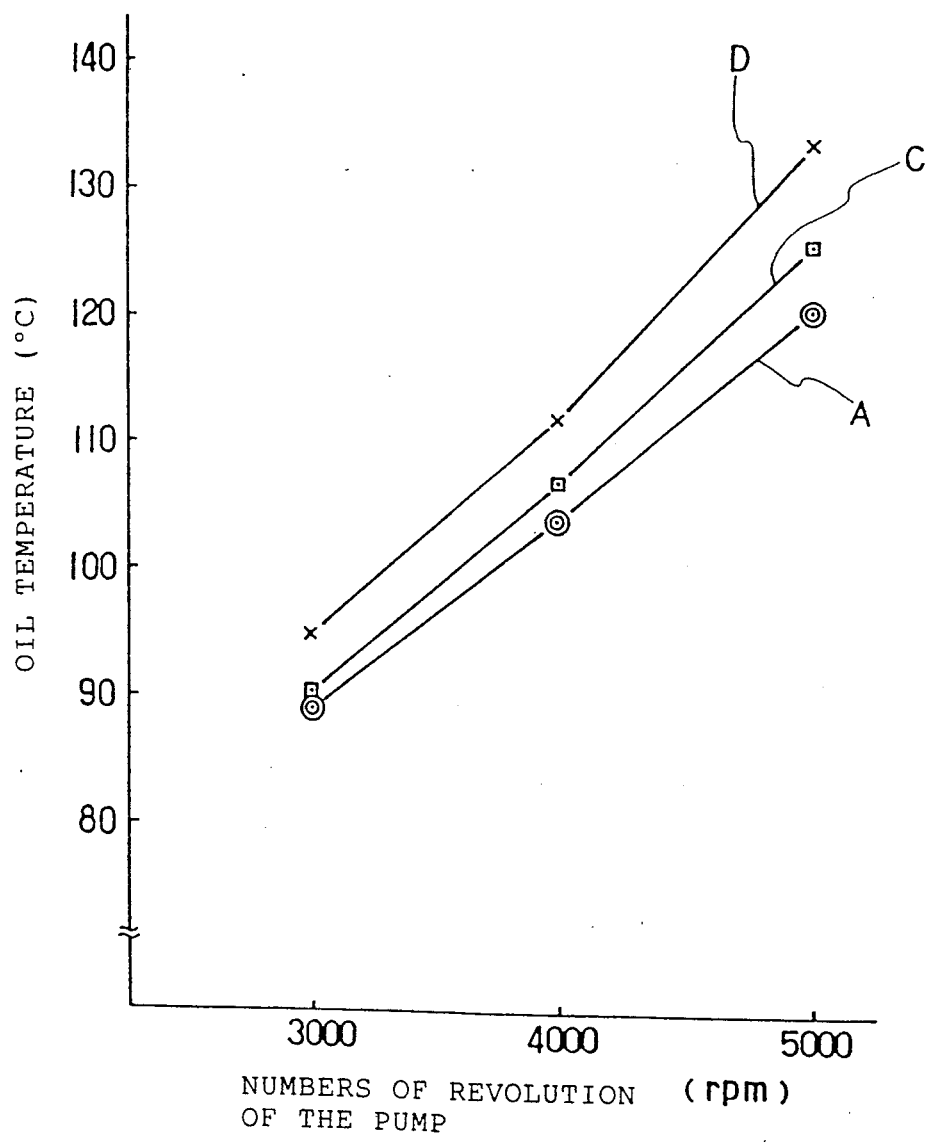
FIG. 11 is a graph showing a result of the cooling capacity test.

In FIG. 7, the numeral 20 designates a testing room of which the whole circumference sides are closed up. Its width is 1,000 mm, its height is 800 mm and its depth is 800 mm. Three fans 21 are installed on the back wall of the testing room. Diameter of the fan 21 is 250 mm. Internal diameter of the fan-installing aperture is 265 mm. As illustrated in FIGS. 8 and 9, the oil cooler A of the first embodiment and the oil cooler C of the comparative example were attached respectively at a position with distance of 100 mm on this side of the fans 21. The oil cooler A was attached so that the wind blew effectively against all three tubes 1, as illustrated in FIG. 10. The number of revolutions of each fan 21 was 1170 rpm. The wind velocity at positions with distance of 100 mm on this side of each fan 21 was as follows: 1 : 1.3 m/sec, 2 : 3.2 m/sec, 3 : 1.5 m/sec, 4 : 2.0 m/sec, 5 : 0.8 m/sec (Note; the numerals 1 to 5 designate the positions situated at 200 mm, 400 mm, 500 mm, 600 mm, 800 mm in the distances from the side end respectively at 600 mm in height in all cases.) The temperature in the testing room was 60° C. during the testing. Oil (power steering fluid) was circulated through the oil cooler A, C as a testing subject and was returned into a tank 23 with a hydraulic pump 22. And the temperature of the return oil in the tank 23 was measured. When the numbers of revolution of the pump 22 are 3.000 rpm, 4.000 rpm, and 5000 rpm. the rates of flow are 7.7 l/min, 7.9 l/min and 8.4 l/min. The results obtained by above testing are shown in FIG. 11. In the drawing, the line A designates the temperature of the returned oil in case the oil cooler A of the first embodiment was used, the line C designates the temperature of the returned oil in case the oil cooler C of the comparative example was used and the line D designates the temperature of the returned oil in case a hose was connected without using any oil cooler.

As clearly shown in FIG. 11, the temperature of the returned oil in case the oil cooler A of the first embodiment was used is lower than the temperature of the returned oil in case the oil cooler C of the comparative example was used. Then it is understood that the cooling capacity of the oil cooler A of the first embodiment is superior than the comparative example. Further, it can be easily guessed that the oil cooler B of the second example attains further effective cooling capacity.

Fourthly the strength is high. Since a plurality of tubes 1 act as struts and the inner brims 9 of the cooling fins 7 act to prevent the tortion of the tubes 1, the whole strength, especially the tortional strength, becomes sufficiently high. Accordingly, noise is not generated almost completely even if vibration is added.

Next, an embodiment of the manufacturing process of the present invention will be now explained with reference to FIG. 12.

(I): The sheets material 7a to be transformed into the cooling fins 7 are blanked, and at the same time, starting holes 8a of the insertion holes 8 and pores 11 are punched.

(II): The starting holes 8a of the sheet material 7a are expanded in the radial direction by burring processing to form the insertion holes 8 and the brims 9. Then, the cooling fins 7 are made up.

(III): The tubes 1 are cut at a predetermined length.

(IV): Three tubes 1 are inserted to the insertion holes 8 of each cooling fin 7 and linear brazing materials 31 are inserted though the pores 11. As the brazing materials, copper brazing material such as blass and bronze are used.

(V): In parallel with the above-mentioned stage, chambers 2 and fittings 6 are prepared. It is desirable to form a chambers by stamping a flat sheet to a cylindrical shape since the process is easy. Next, a step portion 3a is formed at the opening portion of the chamber 2 by cutting work, and holes 3b for attaching fittings 6 are drilled through the side wall of the body 2. On the other hand, lids 4 are made up from sheets by means of stamping work, and at the same time, holes 5 are punched through. The fittings 6 are formed by cutting a pipe, for example a pipe with an outside diameter of 10 mm. and a bulge portion 6a is formed at its top end by means of a buldging work. The lids 4 is inserted into the body 3 and the base end of the fittings 6 is inserted into the hole 3b to assemble the chamber 2.

(VI): The chambers 2 are attached to both ends of the tube bundle 10. Therefore, linear brazing materials 31 are wound around the end portion of the fittings 6, a portion of the tube 1 contacting with the lid 4 and a fitting portion between the lid 4 and the body 3.

(VII): Then, the assembly is put into a furnace in which temperature is about 1100° C. Therefore, the brazing materials 31 are melted to braze the parts to be joined.

After that, leak test is carried out and, in case of need, the surface treatment such as zinc-galvanization or cation electrodeposition is conducted.

Figure 12:
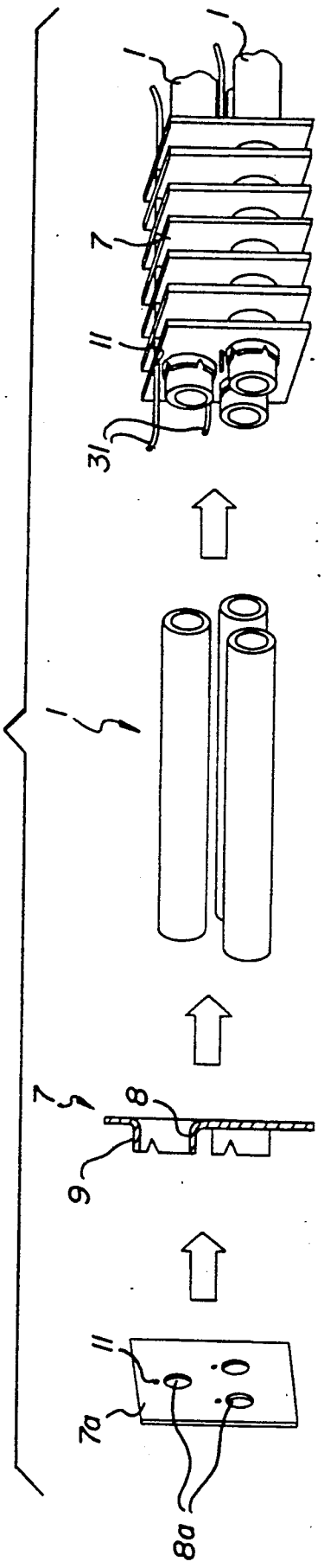
FIG. 12 is a flow diagram showing a manufacturing process of the present invention.
Figure 12:
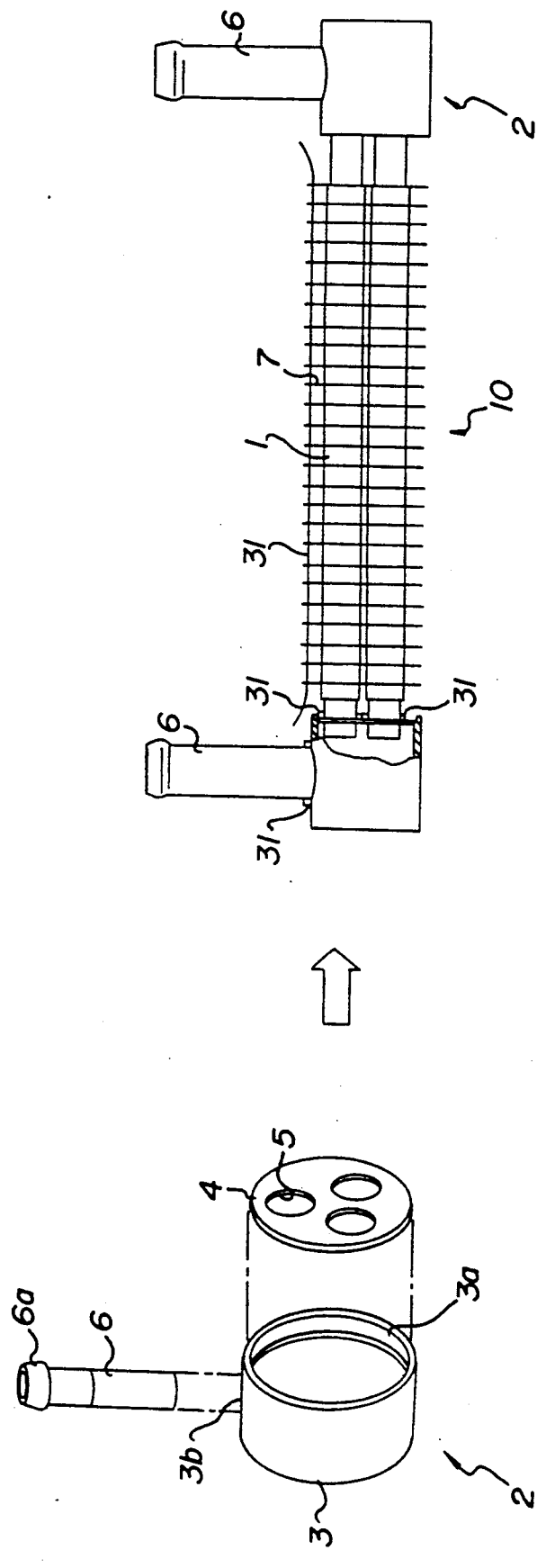

Though FIG. 12 shows a manufacturing process for the oil cooler A having three tubes 1, the oil cooler B of the second embodiment can be also made up by the similar manufacturing process where five insertion holes 8 are prepared.

The advantages of the manufacturing process of the present invention will be described hereinafter.

The fixing working of the cooling fines 7 and tubes 1 is very simple since its essential working is only insertion of the linear brazing materials 31 into the pores 11. In addition, each cooling fin 7 is a piece of sheet, and each cooling fin 7 can be provided to the all of the tubes 1. Therefore, its attaching work is more easy than a case where each fin sheet must be provided to one tube one by one independently. The cooling fin can be made with high production yield, since each fin is a piece of sheet.

We claim:

1. A process for manufacturing the oil cooler having chambers connected to both ends of a tube bundle, hose fittings fixed to each chamber and a plurality of cooling fins fixed to the tube bundle, which comprises the steps of:

(A) making cooling fins by forming a plurality of insertion holes of which inner brim is projected along an axial direction for inserting a plurality of tubes in each sheet to be transformed into a cooling fin, and by drilling a plurality of pores for inserting linear brazing materials, at positions closed to and spaced apart from said insertion holes respectively, (B) inserting a plurality of seamless tubes arranged in parallel into each of insertion holes of a number of the cooling fins respectively, and inserting linear brazing materials into the pores of each of the cooling fins, and (C) joining said brims of the cooling fins to the tubes by melting said brazing materials.

2. A process for manufacturing an oil cooler according to claim 1, further comprising the steps of:

forming end chambers and inserting at least one fitting therein, thereby forming an insertion point, assembling said end chambers to said tubes wherein the plurality of the tubes are inserted to one chamber at each end, thereby forming an insertion point, winding said insertion points with linear brazing materials, and joining said brims of the cooling fins to the tubes, and said insertion points by melting said brazing materials.

* * * * *